(12) United States Patent
Wang et al.

(10) Patent No.: US 11,555,637 B2
(45) Date of Patent: Jan. 17, 2023

(54) ELECTRONIC EXPANSION VALVE

(71) Applicant: Emerson Climate Technologies (Suzhou) Co., Ltd., Jiangsu (CN)

(72) Inventors: Yufeng Wang, Suzhou (CN); Jingxi Liu, Suzhou (CN); Liang Chen, Suzhou (CN)

(73) Assignee: Emerson Climate Technologies (Suzhou) Co., Ltd., Jiangsu (CN)

( * ) Notice: Subject to any disclaimer, the term of this patent is extended or adjusted under 35 U.S.C. 154(b) by 0 days.

(21) Appl. No.: 16/763,491

(22) PCT Filed: Nov. 13, 2018

(86) PCT No.: PCT/CN2018/115152
§ 371 (c)(1),
(2) Date: May 12, 2020

(87) PCT Pub. No.: WO2019/091484
PCT Pub. Date: May 16, 2019

(65) Prior Publication Data
US 2021/0071921 A1     Mar. 11, 2021

(30) Foreign Application Priority Data

Nov. 13, 2017   (CN) .......................... 201711114430.6
Nov. 13, 2017   (CN) .......................... 201721511520.4

(51) Int. Cl.
*F25B 41/31*   (2021.01)
*F25B 41/35*   (2021.01)
*F25B 41/34*   (2021.01)

(52) U.S. Cl.
CPC .............. *F25B 41/31* (2021.01); *F25B 41/34* (2021.01); *F25B 41/35* (2021.01)

(58) Field of Classification Search
CPC .. F25B 41/35; F25B 41/34; F16K 1/02; F16K 1/12; F16K 31/50; F16K 31/12
See application file for complete search history.

(56) References Cited

U.S. PATENT DOCUMENTS

| | | | |
|---|---|---|---|
| 4,858,956 A | 8/1989 | Taxon | |
| 2006/0043325 A1* | 3/2006 | Umezawa | F16K 31/047 251/129.11 |

(Continued)

FOREIGN PATENT DOCUMENTS

| | | |
|---|---|---|
| CN | 201121713 Y | 9/2008 |
| CN | 101403438 A * | 4/2009 |

(Continued)

OTHER PUBLICATIONS

International Search Report (in English and Chinese) and Written Opinion of the International Searching Authority (in Chinese) issued in PCT/CN2018/115152, dated Feb. 12, 2019; ISA/CN.

(Continued)

*Primary Examiner* — Kun Kai Ma
(74) *Attorney, Agent, or Firm* — Harness, Dickey & Pierce, P.L.C.

(57) ABSTRACT

An electronic expansion valve is provided including: a valve body provided with a first port and a second port, a first cavity being defined in the valve body and being in fluid communication with the first port, the valve body also being provided with a valve port between the second port and the first cavity; a drive mechanism including a rotor having a rotor screw and a stator; a valve spindle assembly at least partially disposed in the valve body and being capable of operatively cooperating with the rotor screw for reciprocating motion to adjust the degree of opening of the valve port; and a second cavity isolated and sealed off from the first cavity, wherein a balancing passage is formed in the rotor (Continued)

screw and the valve spindle assembly to enable the second cavity to be in fluid communication with the second port via the balancing passage.

13 Claims, 8 Drawing Sheets

(56) References Cited

U.S. PATENT DOCUMENTS

| | | | | |
|---|---|---|---|---|
| 2009/0020716 A1* | 1/2009 | Hokazono | ............... | F25B 41/20 |
| | | | | 251/129.11 |
| 2011/0012038 A1* | 1/2011 | Lv | ......................... | F16K 31/047 |
| | | | | 251/129.01 |
| 2014/0353391 A1* | 12/2014 | Burklin | ................... | F25B 41/31 |
| | | | | 236/92 B |
| 2015/0020540 A1* | 1/2015 | Wakisaka | ................ | F25B 41/31 |
| | | | | 62/528 |
| 2017/0002931 A1* | 1/2017 | Shu | ......................... | F25B 41/31 |
| 2017/0122631 A1* | 5/2017 | Birkelund | ........... | F16K 37/0083 |
| 2018/0238455 A1* | 8/2018 | Yazawa | ..................... | F16K 1/54 |
| 2020/0124327 A1* | 4/2020 | Zhou | ......................... | F16K 1/32 |
| 2020/0208893 A1* | 7/2020 | Zhang | ..................... | F25B 41/31 |
| 2020/0318742 A1* | 10/2020 | Mercer | ................. | F16K 11/022 |

FOREIGN PATENT DOCUMENTS

| | | |
|---|---|---|
| CN | 201359097 Y | 12/2009 |
| CN | 202520963 U | 11/2012 |
| CN | 103453201 A | 12/2013 |
| CN | 203413221 U | 1/2014 |
| CN | 207830566 U | 9/2018 |
| DE | 68916435 T2 | 12/1994 |
| EP | 3018434 A1 | 5/2016 |

OTHER PUBLICATIONS

CA Extended European Search Report regarding Application No. 18876250.4 dated Jul. 6, 2021.

* cited by examiner

ELECTRONIC EXPANSION VALVE

CROSS-REFERENCE TO RELATED APPLICATIONS

The present application is the national phase of International Application No. PCT/CN2018/115152 titled "ELECTRONIC EXPANSION VALVE" and filed on Nov. 13, 2018, which claims the benefit of priorities to Chinese Patent Application No. 201711114430.6, titled "ELECTRONIC EXPANSION VALVE", filed with the China National Intellectual Property Administration on Nov. 13, 2017; and Chinese Patent Application No. 201721511520.4, titled "ELECTRONIC EXPANSION VALVE", filed with the China National Intellectual Property Administration on Nov. 13, 2017, the entire disclosures of which are incorporated herein by reference.

FIELD

The present application relates to the technical field of flow regulating valve, and in particular to an electronic expansion valve.

BACKGROUND

The contents in this section only provide background information relating to the present disclosure, which may not necessarily constitute the prior art.

The electronic expansion valve is a key component in a refrigerating/heating system (such as an air-conditioning system), which is generally controlled by a stepping motor to regulate the flow rate of fluid (for example, a refrigerant) flowing into the electronic expansion valve. Generally, an electronic expansion valve includes a driving mechanism (for example, a stepping motor), a transmission mechanism (for example, a threaded screw/a gear pair and a threaded screw), a flow regulating mechanism (for example, a valve spindle assembly including a valve spindle, and a valve seat provided with a valve port), and related auxiliary support mechanisms. The driving force of the driving mechanism is transmitted to the flow regulating mechanism through the transmission mechanism, so as to drive the valve spindle assembly to reciprocate linearly and control the opening and closing of the valve port and/or the opening degree of the valve port, thereby controlling the flow rate of the fluid flowing through the electronic expansion valve.

However, since the electronic expansion valve is in a continuous circulation system, and the upstream and downstream of the valve spindle assembly are usually subjected to different fluid pressures during the up and down movement of the valve spindle assembly of the electronic expansion valve, a larger driving force is required to drive the valve spindle to regulate the opening degree of the valve port.

SUMMARY

An objective of the present disclosure is to provide an electronic expansion valve to achieve one or more of the following objectives of: reducing the driving force required to drive the valve spindle assembly provided by the driving mechanism, improving the operation stability and reliability of the electronic expansion valve, improving the regulation accuracy of the electronic expansion valve, improving the working efficiency, simplifying the structure of the electronic expansion valve and reducing the cost.

According to an aspect of the present disclosure, an electronic expansion valve is provided, which includes:
- a valve body; wherein the valve body is provided with a first port for fluid to flow in or out, and a second port for fluid to flow out or in; the valve body defines a first cavity which is in fluid communication with the first port; and the valve body is further provided with a valve port located between the second port and the first cavity, wherein the first cavity is selectively in fluid communication with the second port through the valve port;
- a driving mechanism which is fixed to the valve body and comprises a stator and a rotor, wherein the rotor is integrally connected with a rotor screw;
- a valve spindle assembly which is at least partially provided in the valve body, wherein the valve spindle assembly is capable of cooperating with the rotor screw for reciprocating motion, thereby regulating the opening degree of the valve port; and
- a second cavity which is defined between the rotor and the valve spindle assembly, wherein the second cavity (C2) is isolated and sealed off from the first cavity,
- wherein a balance passage is provided in the rotor screw and the valve spindle assembly so that the second cavity is in fluid communication with the second port through the balance passage.

According to an embodiment, the valve spindle assembly comprises a valve stem and a valve spindle which cooperate with each other, the balance passage comprises a first passage provided in the valve spindle, a second passage provided in the valve stem and a third passage provided in the rotor screw, and the first passage, the second passage, and the third passage are in fluid communication with each other.

According to an embodiment, the valve stem is operatively engaged with the rotor screw via a threaded portion provided in the valve stem, and the second cavity is further be capable of being in fluid communication with the second port through the clearance between the rotor screw and the threaded portion of the valve stem.

According to an embodiment, the third passage comprises an axial section and a radial section which are formed in the rotor screw and are in fluid communication with each other.

According to an embodiment, the second cavity is isolated and sealed off from the first cavity by a cavity sealing member provided outside the valve stem.

According to an embodiment, the electronic expansion valve further comprises a support member, the driving mechanism is supported on the valve body by the support member, and the valve spindle assembly is supported by the support member so that the valve spindle assembly is slidable in a longitudinal direction of the electronic expansion valve but is not rotatable.

According to an embodiment, the support member has a through hole in the center, the valve spindle assembly is slidable in the through hole and the cavity sealing member is provided in the through hole and surrounds the valve stem.

According to an embodiment, the valve body and the support member are joined together via a threaded connection and a valve-body sealing member is provided between the valve body and the support member.

According to an embodiment, the valve stem is fixedly engaged with the valve spindle.

According to an embodiment, the valve body has a first end portion and a second end portion which are opposite to each other, wherein the second port is provided in the first end portion of the valve body and the first port is provided on a side wall of the valve body; the support member has a first portion and a second portion, wherein the first portion is hermetically and fixedly connected to the second end portion of the valve body, and the stator of the driving mechanism is supported on the second portion; and the first cavity is defined in the valve body between the first portion of the support member and the second port.

According to an embodiment, a radial extension portion extending radially inward from an inner wall of the valve body is provided at the first end portion of the valve body, and the valve port penetrates the radial extension portion and is provided at the center of the radial extension portion.

According to an embodiment, the valve spindle comprises a tapered end portion which is configured to cooperate with the valve port to regulate the opening degree of the electronic expansion valve, and a valve-port sealing member is provided outside the tapered end portion.

According to an embodiment, a flange portion is circumferentially provided on a mouth portion of the valve port facing the first cavity, and when the valve spindle is in a position to close the valve port, the flange portion abuts against the valve-port sealing member.

In the electronic expansion valve according to the present disclosure, the amount of fluid in the second cavity can be flexibly regulated by providing the balance passage to fluidly communicate the second cavity to the second port. Therefore, in the electronic expansion valve according to the present disclosure, the driving force required by the driving mechanism to drive the valve spindle assembly is greatly reduced, thereby lowering the performance requirements of the driving mechanism, simplifying the structure of the electronic expansion valve and reducing the cost. Moreover, the valve spindle assembly is directly threaded to the rotor screw and the valve spindle is directly fixed to the valve stem, thereby improving the regulation accuracy of the electronic expansion valve, ensuring the repeatability and stability of the flow rate regulation performance, further simplifying the structure and the assembly process of the electronic expansion valve and reducing the cost.

BRIEF DESCRIPTION OF THE DRAWINGS

The features and advantages of one or more embodiments of the present disclosure will become more readily understood from the following description made with reference to the accompanying drawings. The drawings described herein are only for the purpose of illustration, and are not intended to limit the scope of the present application in any way. The drawings are not drawn to scale, and some features may be enlarged or minified to show the details of a particular member. In the accompanying drawings.

DETAILED DESCRIPTION OF THE EMBODIMENTS

Figure 1:
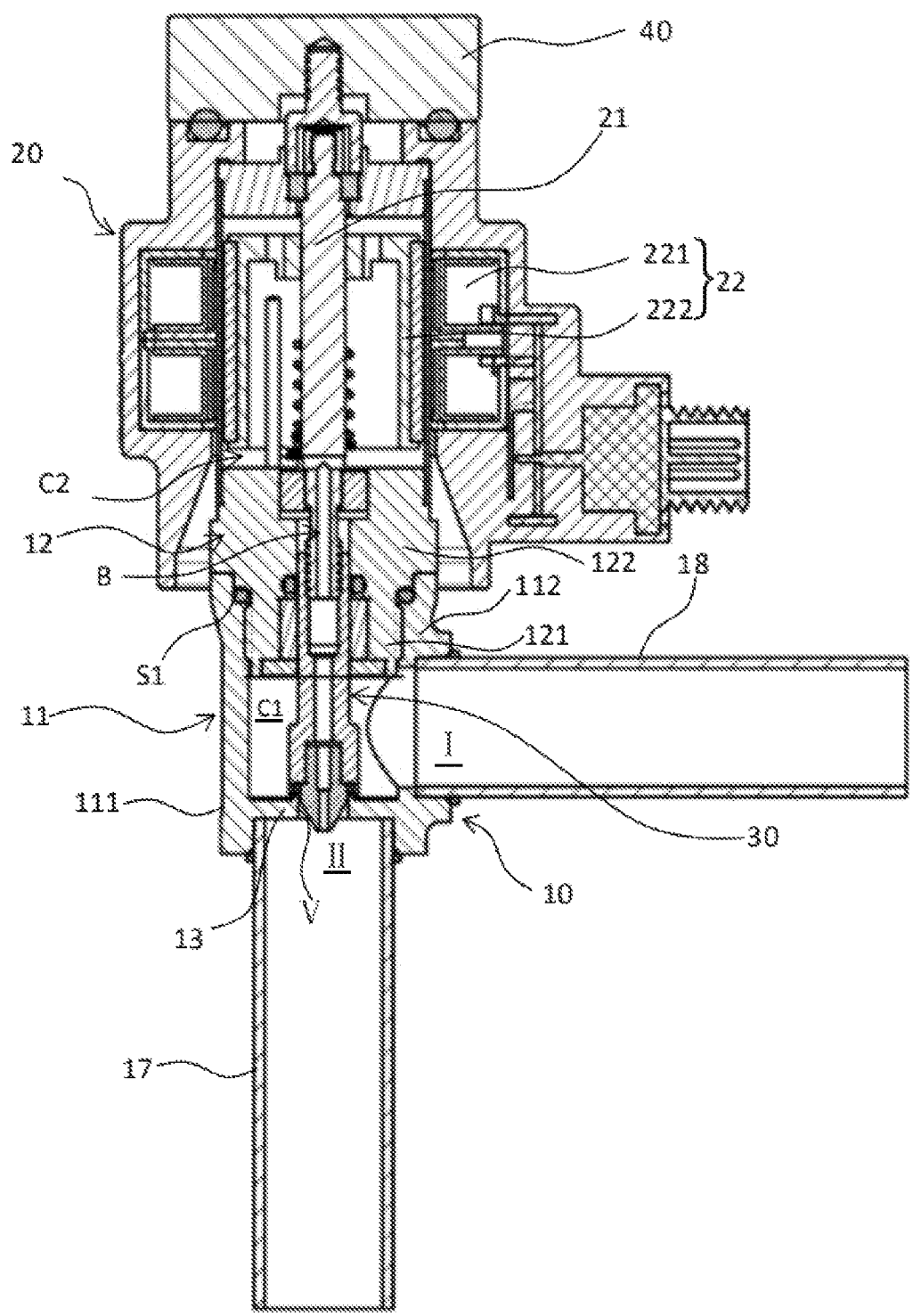
FIG. 1 is a schematic sectional view of an electronic expansion valve according to an embodiment of the present disclosure.

The following description of various embodiments of the present disclosure is merely exemplary and is by no means intended to limit the present disclosure, its application or usage. Same reference numerals are used to represent same parts throughout the drawings, and the configuration of the same parts will not be described repeatedly.

The structure of the electronic expansion valve according to the present disclosure will be described herein by taking an electronic expansion valve applied to a refrigerating/heating system as an example. It is conceivable that, structures of the electronic expansion valve and related components according to the present disclosure should not be limited by the application environment mentioned in the present disclosure, these structures can be applied to any feasible field or application, and, according to the related innovative ideas of the present disclosure, these structures can be applied to other valve structures or related structures for controlling the flow rate of the fluid.

Figure 2:
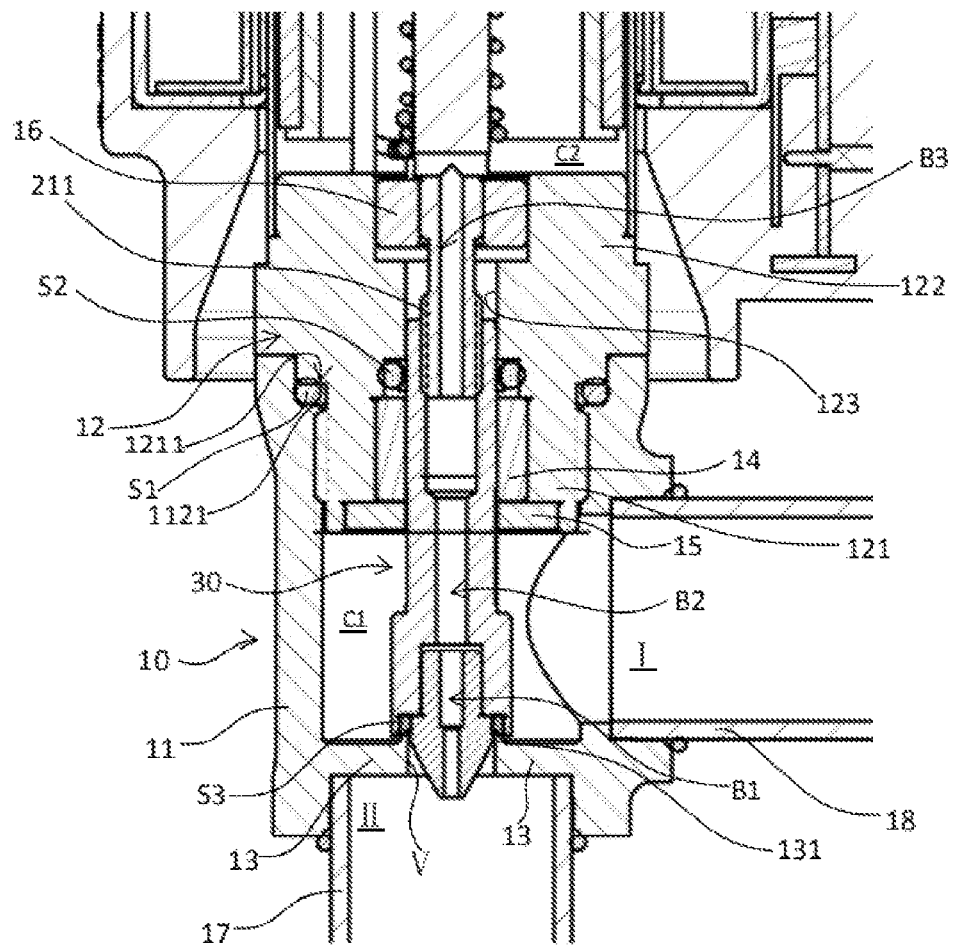
FIG. 2 is a schematic partially enlarged view of the electronic expansion valve in FIG. 1.
Figure 3:
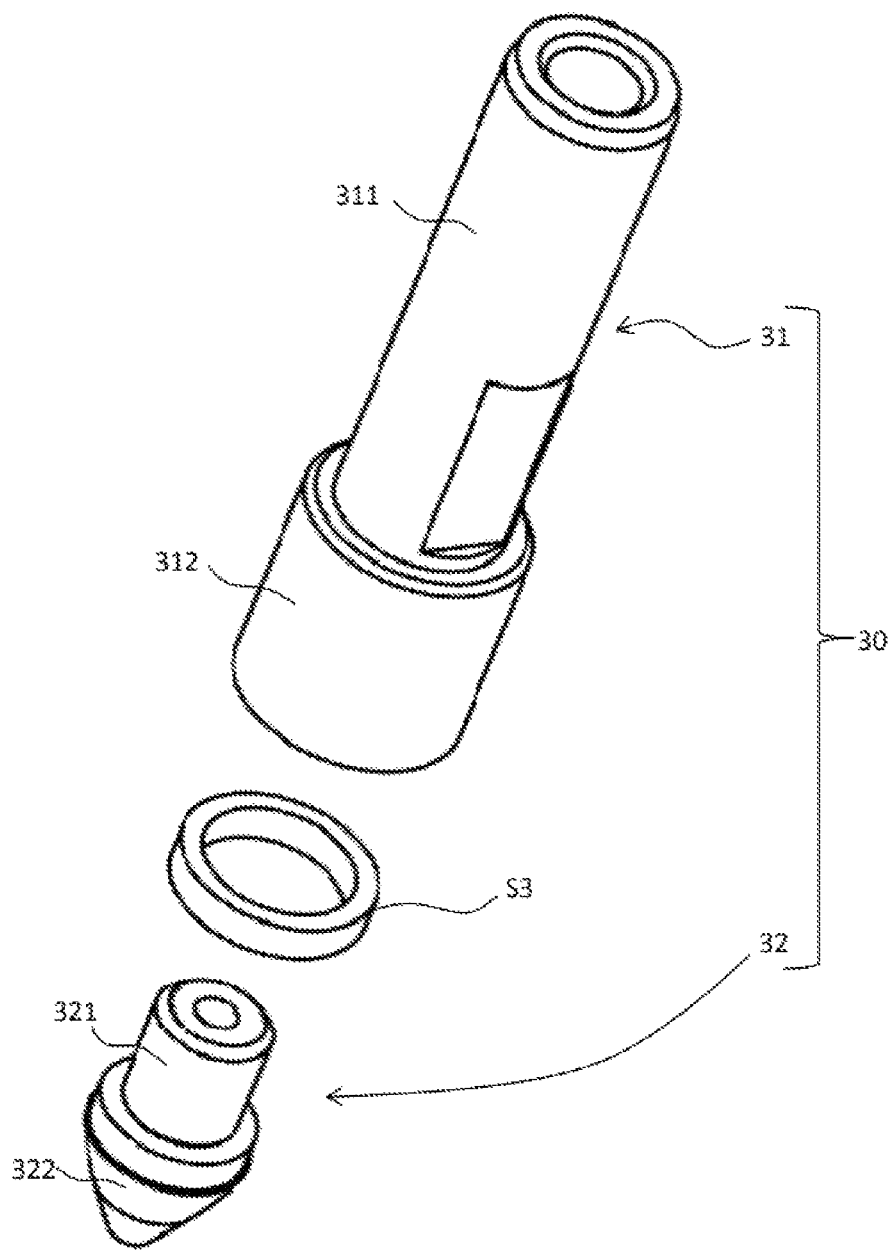
FIG. 3 shows a perspective exploded view of a valve spindle assembly according to an embodiment of the present disclosure.
Figure 4:
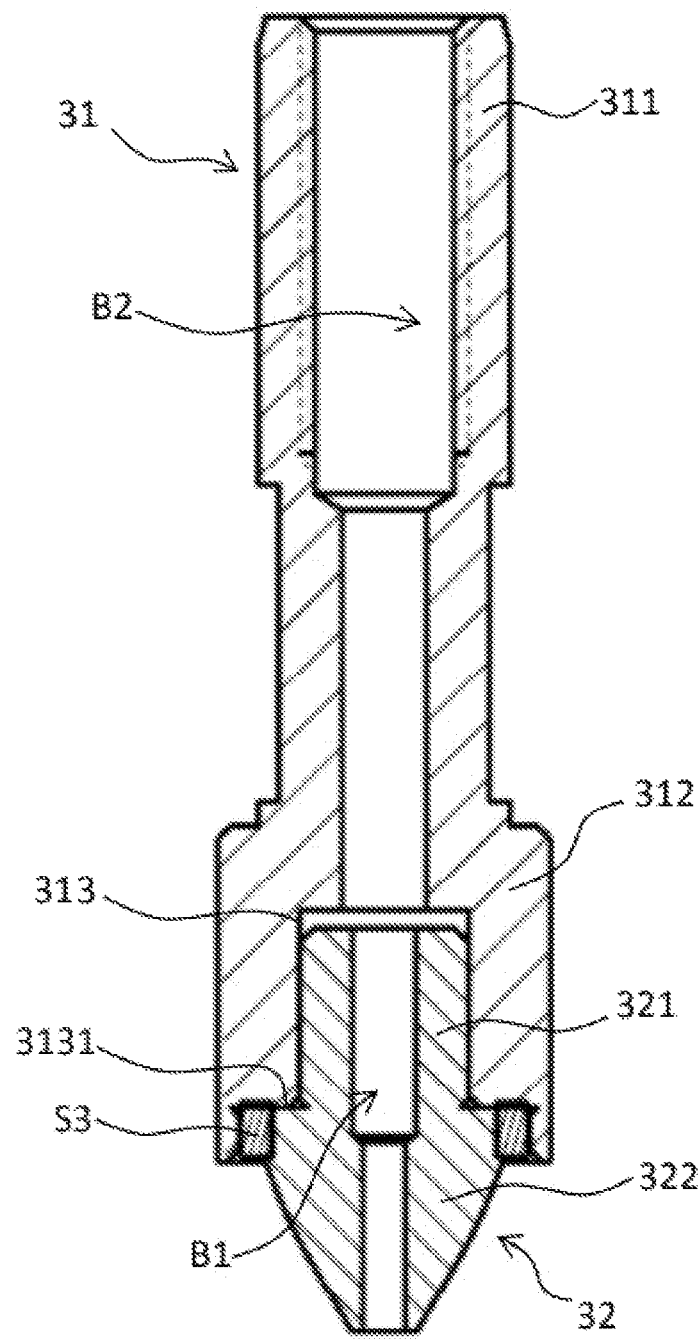
FIG. 4 shows an assembled sectional view of the valve spindle assembly according to an embodiment of the present disclosure.
Figure 5:
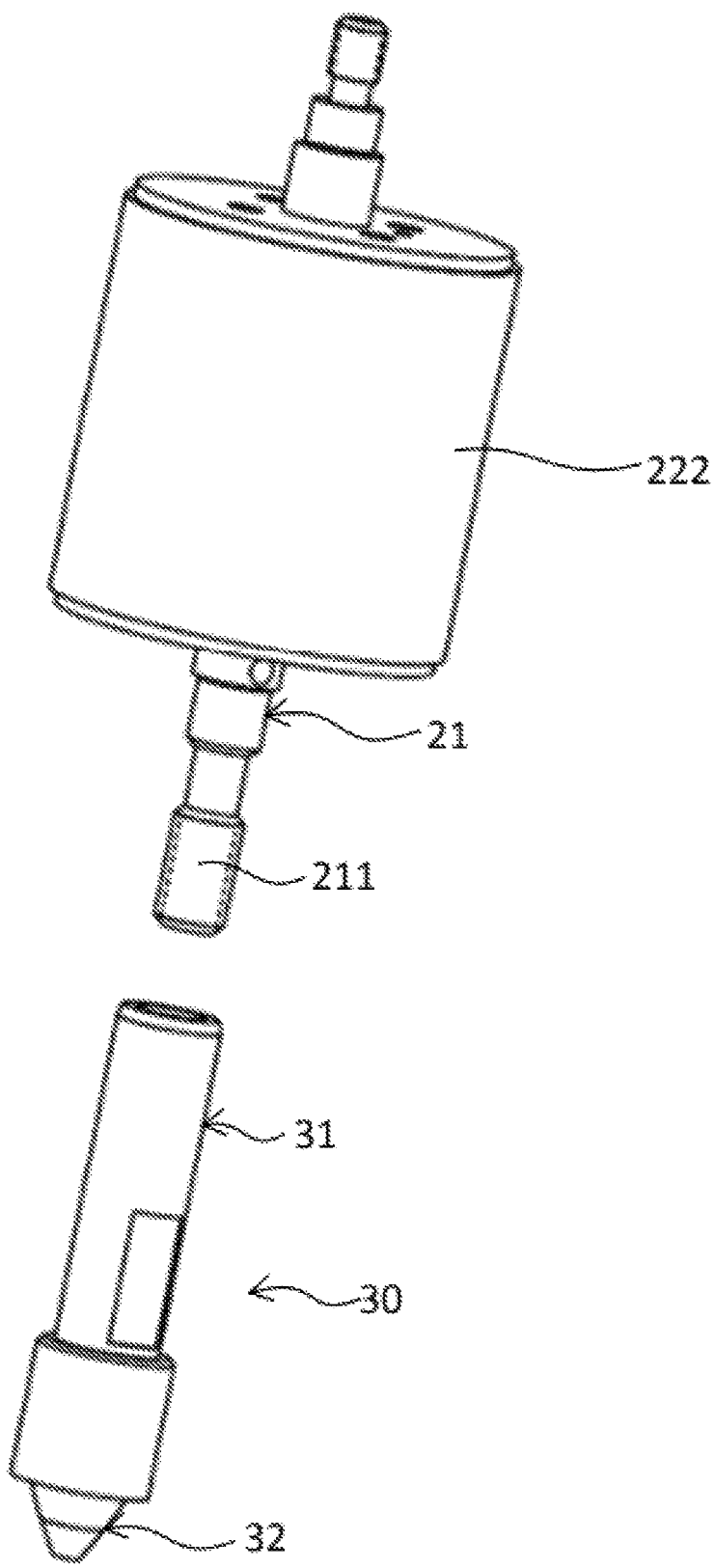
FIG. 5 shows a perspective exploded view of a part of a driving mechanism and the valve spindle assembly according to an embodiment of the present disclosure.
Figure 6:
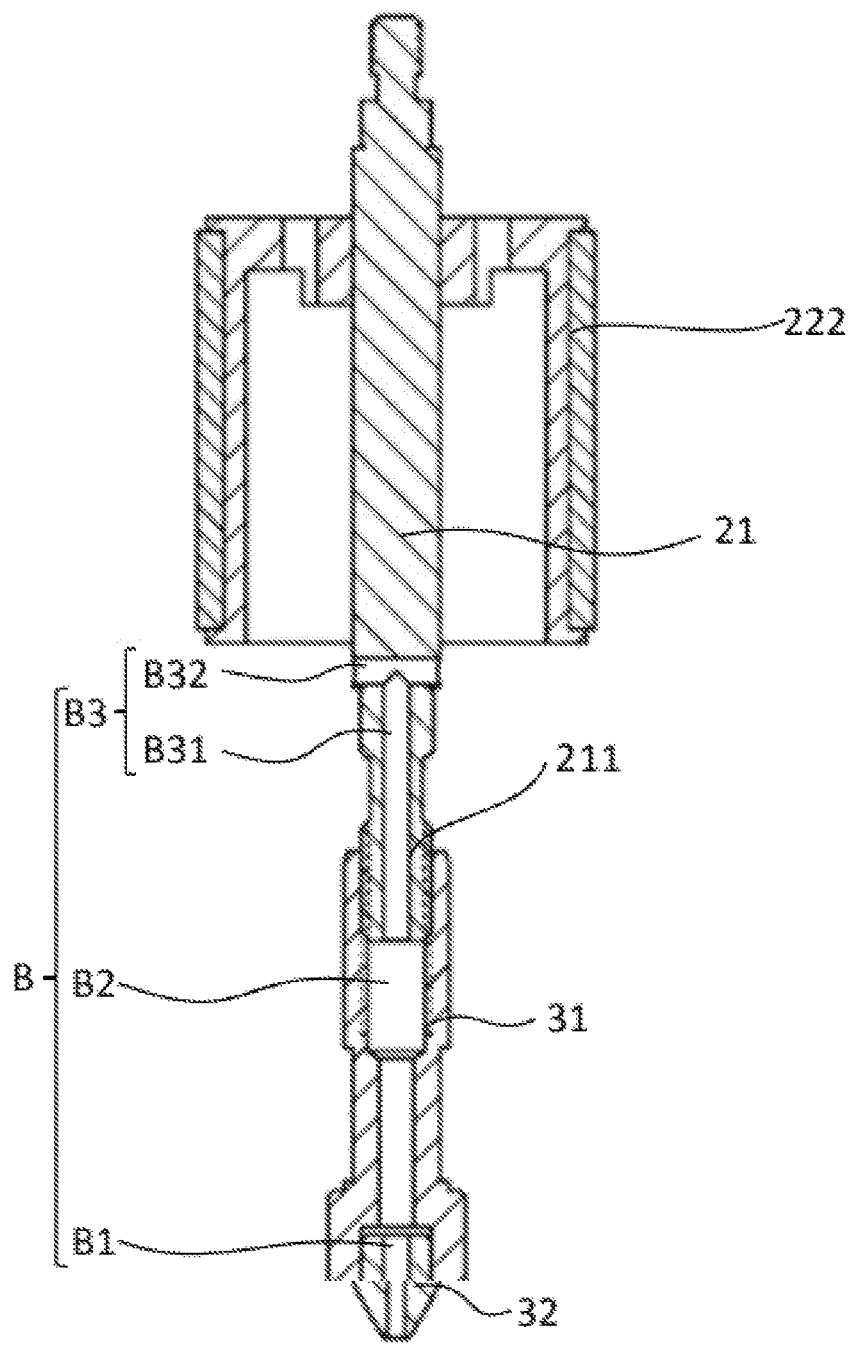
FIG. 6 shows an assembled sectional view of a part of the driving mechanism and the valve spindle assembly according to an embodiment of the present disclosure.
Figure 7:
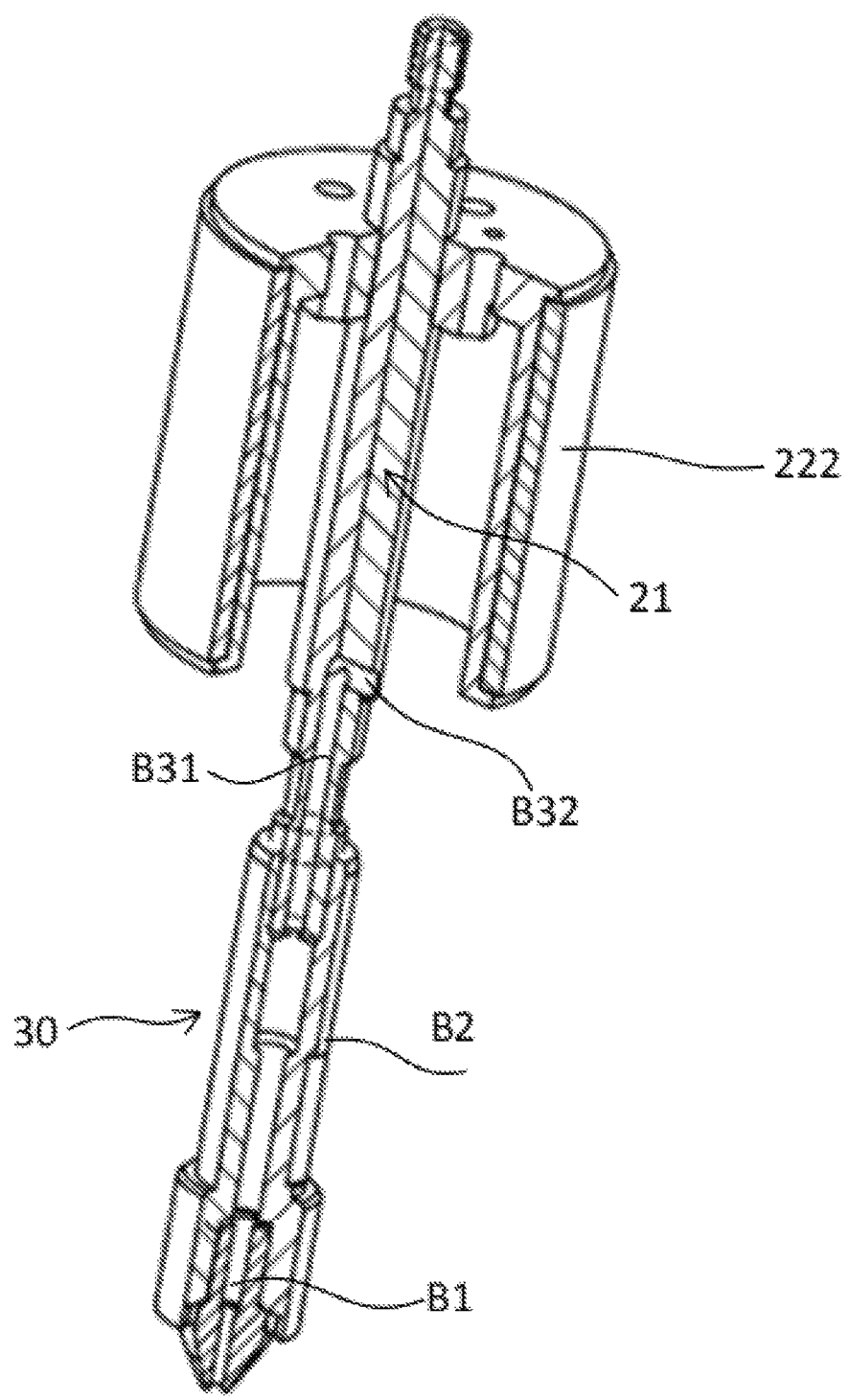
FIG. 7 and FIG. 8 show perspective sectional views of a part of the driving mechanism and the valve spindle assembly according to the embodiments of the present disclosure viewed from two different angles respectively.
Figure 8:
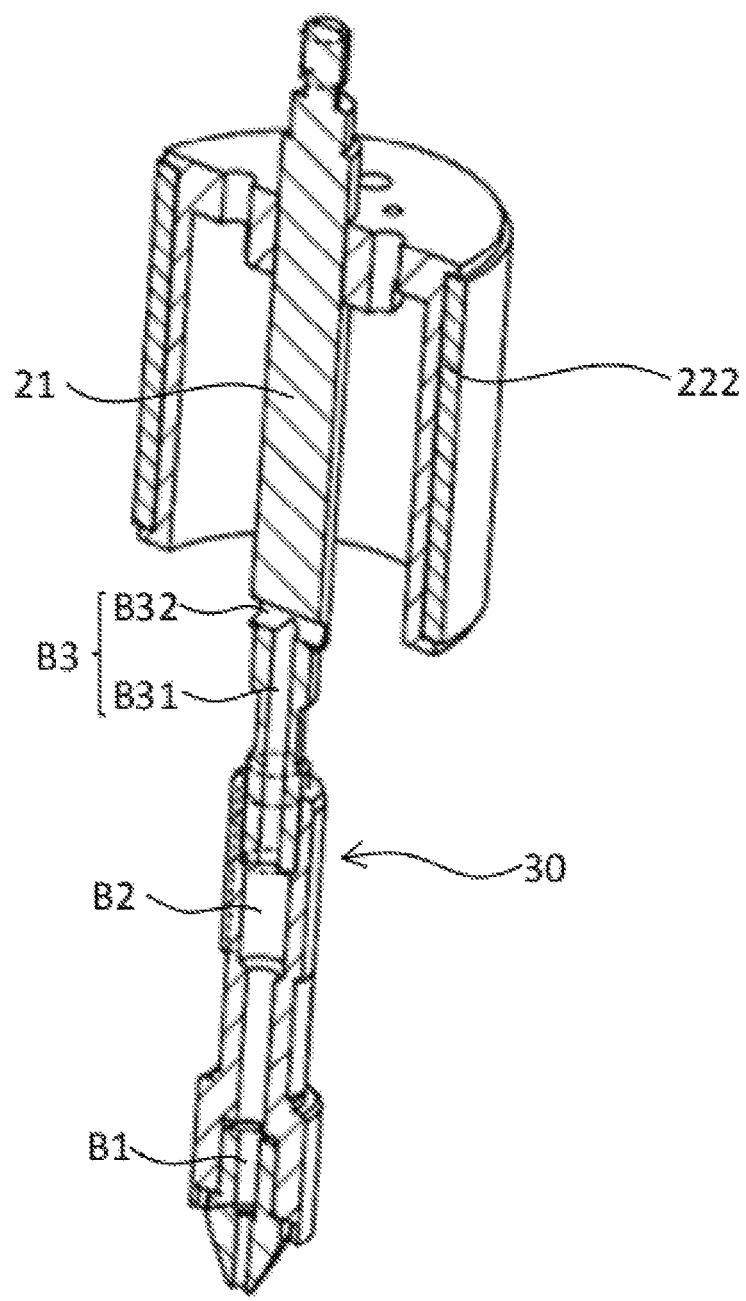

First, the overall configuration of the electronic expansion valve according to the present disclosure is described with reference to FIGS. 1 and 2. FIG. 1 is a schematic sectional view of an electronic expansion valve according to an embodiment of the present disclosure; and FIG. 2 is a schematic partially enlarged view of the electronic expansion valve in FIG. 1.

As shown in FIG. 1, the electronic expansion valve may generally include a valve body assembly 10, a driving mechanism 20, a valve spindle assembly 30, a support member 12, and an upper cover 40. The driving mechanism 20 is arranged between the upper cover 40 and the valve body assembly 10. The valve spindle assembly 30 is generally arranged inside the valve body assembly 10. The valve body assembly 10 may include a valve body 11. The valve body 11 may be provided with a first port I and a second port II for fluid to flow out and in. Depending on the specific application of the electronic expansion valve, the first port I and the second port II may respectively serve as an inlet and an outlet; or according to the change of the flow direction of the fluid, the first port I may serve as the inlet/outlet, and the second port II may serve as the outlet/inlet. That is to say, in a case that the fluid flows in a constant direction in the electronic expansion valve (that is, in the case of a unidirectional valve), the first port I may serve as the inlet, and the second port II may serve as the outlet, and vice versa. In a case that the fluid can flow in two opposite directions in the electronic expansion valve (that is, in the case of a bidirectional valve), and when the fluid flows in one direction, the first port I serves as the inlet and the second port II serves as the outlet; and when the fluid flows in the other direction, the second port II may serve the inlet, and the first port I may serve as the outlet, and vice versa.

The valve body 11 may define a first cavity C1, and the valve body 11 may be provided with a valve port V located between the second port II and the first cavity C1, which is configured to cooperate with the valve spindle assembly 30 to be described below, so as to regulate the flow rate of the fluid. The first port I is in fluid communication with the first cavity C1, and the first cavity C1 is selectively in fluid communication with the second port II through the valve port V. In this way, the fluid flowing in from the first port I can flow into the second port II through the first cavity C1 and selectively through the valve port V. Conversely, the fluid flowing in from the second port II can flow into the first cavity C1 selectively through the valve port V, and then flow into the first port I.

The valve body assembly 10 further includes connecting pipes 17 and 18 (such as copper pipes), provided at the first port I and the second port II of the valve body 11 respectively, for connecting with external connecting pipes. Optionally, the external connecting pipes may be directly connected to the first port I and the second port II of the valve body 11.

The driving mechanism 20 may include a motor 22 (for example, a stepping motor). The motor 22 includes a stator 221 and a rotor 222. The rotor 222 is connected with a rotor screw 21. The rotor screw 21 is fixed to the rotor 222 to rotate together with the rotor 222. The components other than the rotor screw 21 in the driving mechanism 20 applied in the present disclosure may adopt structures known in the art, and therefore will not be described in detail in the present disclosure. The upper cover 40 covers the top of the driving mechanism 20 to shield and protect related components in the driving mechanism.

The valve spindle assembly 30 is at least partially arranged in the valve body 11 for being driven by the driving mechanism to regulate the opening degree of the valve port V. The valve spindle assembly 30 is operatively coupled to the rotor screw 21 (or in other words, operatively engaged with the rotor screw 21), so that rotation of the rotor screw 21 can be converted into linear reciprocating motion of the valve spindle assembly 30 (in the example shown in FIG. 1, the valve spindle assembly reciprocates in upward and downward directions), and the valve spindle assembly thereby cooperates with the valve port V to selectively open or close the valve port V or regulate the opening degree of the valve port V.

According to an embodiment of the present disclosure, the valve spindle assembly 30 is connected with the rotor screw 21 by means of threads (that is, forming a thread pair, which is well known in the art and will not be described in detail herein), so that the valve spindle assembly 30 can move up and down when the rotor screw 21 is driven by the rotor 222 to rotate. For example, a threaded portion may be provided in a valve stem 31 to be described below, so that the valve stem can be threaded with an external thread on the rotor screw 21. Conversely, the valve stem 31 may be provided with an external thread, and the rotor screw 21 as a transmission member may be provided with a mating internal thread.

More specifically, the valve spindle assembly 30 may include a valve stem 31 and a valve spindle 32 which are fixedly connected to each other. A first end portion 311 of the valve stem 31 may be engaged with a first end portion 211 of the rotor screw 21 in a manner of forming a thread pair. The valve spindle 32 may be configured to cooperate with the valve port V to selectively open and close the valve port V.

In this case, when the fluid flows into the electronic expansion valve from the first port I or the second port II, the rotor screw 21 rotates under the drive of the rotor 222 by energizing the driving mechanism 20. The rotation of the rotor screw 21 is further converted into the up and down movement of the valve stem 31. As the valve stem 31 moves up and down, the valve spindle 32 fixedly connected to the valve stem 31 can further cooperate with the valve port V, so as to open or close the valve port V, or regulate the opening degree of the valve port V and regulate the amount of the fluid flowing through the electronic expansion valve.

However, it is conceivable that, the opening and closing of the valve port V is achieved by the up and down movement of the valve spindle assembly 30, and the up and down movement of the valve spindle assembly 30 requires a certain space. Therefore, a certain space inevitably exists between the valve spindle assembly 30 and the driving mechanism 20. During the operation of the electronic expansion valve, fluid from the first port I or the second port II easily enters the space through a fit clearance between relevant components. The volume of the fluid in the space changes as the valve spindle assembly 30 moves up and down, thereby forming a back pressure cavity that influences the operation of the valve spindle assembly 30. In a case that the valve port V is closed, when the driving mechanism 20 is required to drive the valve spindle assembly 30 to move it upward to open the valve port V, since the valve spindle assembly 30 reduces the volume of the fluid in the back pressure cavity, the fluid in the back pressure cavity exerts a larger resistance on the valve spindle assembly, and thereby the driving mechanism needs a larger driving force to lift the valve spindle assembly 30. For this reason, the electronic expansion valve in the prior art is usually equipped with a driving mechanism with a larger structure to increase the driving force of the driving mechanism. Such a solution not only complicates the structure of the electronic expansion valve, but also increases the cost.

When the valve spindle assembly 30 is required to move downward to close the valve port V, in particular, in a case that fluid flows in from the second port, the fluid exerts a larger fluid resistance on the valve spindle assembly. Therefore, the driving mechanism is required to have better driving performance.

For this reason, the inventor of this disclosure innovatively proposed an improved electronic expansion valve structure. The structure of the electronic expansion valve according to the present disclosure is further described below with reference to FIGS. 1 to 8. In this disclosure, the back pressure cavity defined between the driving mechanism 20 and the valve spindle assembly 30 is referred to as a second cavity C2. In the illustrated embodiment, the second cavity C2 is mainly defined between the rotor 222 and the valve spindle assembly 30.

According to the present disclosure, the second cavity C2 may be isolated and sealed off from the first cavity C1, and the second cavity C2 can be in fluid communication with the second port 12 through a balance passage B provided in the valve spindle assembly 30 and the rotor screw 21 (as the transmission member).

Thus, due to the arrangement of the balance passage B, the fluid can circulate between the second cavity C2 and the second port through the balance passage B, thereby balancing part of the fluid force acting on the valve spindle assembly. Particularly, in a case that the fluid flows in from the first port, when it is required to open the valve port V, since the second cavity C2 is in fluid communication with the second port II, during the upward movement of the valve spindle assembly 30, the fluid in the second cavity C2 flows into the second port II through the balance passage B as the valve spindle assembly 30 moves, thereby reducing the resistance of the fluid in the second cavity C2 to the valve spindle assembly and further reducing the driving force required by the driving mechanism. In a case that the fluid flows in from the second port, when it is required to close the valve port V, similarly, since the second cavity C2 is in fluid communication with the second port II, part of the fluid flows into the second cavity C2 through the balance passage B during the downward movement of the valve spindle assembly, which not only reduces the fluid resistance on the valve spindle 32, but also facilitates the downward movement of the valve spindle assembly 30 due to the downward pressure applied to the valve spindle assembly 30 by the fluid flowing into the second cavity C2. Therefore, the driving force provided by the driving mechanism to drive the valve spindle assembly 30 is reduced. Therefore, through such a structural arrangement, the electronic expansion valve can be equipped with a smaller driving mechanism, which can simplify the structure of the electronic expansion valve and reduce the cost.

Specifically, as shown in FIGS. 1 and 2, in an embodiment according to the present disclosure, the valve body 11 is a substantially cylindrical structure with two open ends. The valve body 11 may include a first end portion 111 and a second end portion 112 which are opposite to each other. The second port II is arranged at the first end portion 111 of the valve body 11, and the first port I is arranged on a side wall of the valve body 11.

The driving mechanism 20 is supported on the valve body 11 by the support member 12. The support member 12 is hermetically connected to the valve body 11. The support member 12 includes a first portion 121 and a second portion 122. An external thread is provided on an outer wall of the first portion 121. An internal thread is provided on an inner wall of the second end portion 112 of the valve body 11. Therefore, the first portion 121 is fixedly connected to the second end portion 112 of the valve body 11 by threaded connection. The driving mechanism 20 may be partially supported on the second portion 122 of the support member 12.

In addition, a sealing member S1 (referred to as a valve-body sealing member hereinafter for ease of description) is provided between the second end portion 112 of the valve body 11 and the support member 12 to prevent leakage of the fluid from the first cavity C1 to outside. Optionally, the valve-body sealing member S1 may be provided on a side of the threaded engagement portion between the first portion 121 of the support member 12 and the second end portion 112 of the valve body 11 away from the first cavity C1.

Specifically, as can be more clearly seen from the partially enlarged view shown in FIG. 2, a recess 1121 is provided on an end surface of the second end portion 112 of the valve body 11, and a protrusion 1211 is provided between the second portion 122 and the first portion 121 of the support member 12. The valve-body sealing member S1 is inserted between the recess 1121 and the protrusion 1211. Thus, when the first portion 121 of the support member 12 and the second end portion 112 of the valve body 11 are threaded together, the valve-body sealing member S1 is hermetically arranged between the stepped recess 1121 and the stepped protrusion 1211, and the end surface of the second end portion 112 of the valve body 11 abuts against the second portion 122 of the support member 12.

Optionally, the valve-body sealing member S1 may be arranged in other ways, for example, a groove may be provided on one or both of the joint surfaces between the valve body 11 and the second portion 122 of the support member 12, and the valve-body sealing member S1 may be arranged in the groove. Apparently, other structural arrangements may also be feasible.

A radial extension portion 13 extending radially inward from an inner wall of the valve body 11 is provided in the first end portion 111 close to the valve body 11. The valve port V may penetrate through the radial extension portion 13 and is provided at the center of the radial extension portion 13. Thereby, the first cavity C1 is defined in the valve body 11 between the first portion 121 of the support member 12 and the radial extension portion 13 (or the valve port V).

The stator 221 of the driving mechanism 20 is supported on the second portion 122 of the support member 12. The connection between the driving mechanism 20 and the second portion 122 may be implemented in any existing manner, and will not be described in detail herein again.

As shown in FIGS. 1 and 2, the support member 12 may have a through hole 123 in the center. A first end 211 of the rotor screw 21 may extend into the through hole 123 in a rotatable manner.

A bearing (for example, a rolling bearing) 16 is provided between the second portion 122 of the support member 12 and the rotor screw 21 to support and guide the rotation of the rotor screw 21.

According to an embodiment of the present disclosure, the valve spindle assembly 30 (specifically, the valve stem 31) is slidable up and down in the through hole 123 in a hermetical manner. To this end, a sealing member (referred to as a cavity sealing member hereinafter for ease of description) S2 is provided between the support member 12 and the valve spindle assembly 30 to further fluidly isolate the first cavity C1 from the second cavity C2. In addition, a guide member 14 and an anti-rotation member 15 are provided between the support member 12 and the valve spindle assembly 30. The guide member 14 is configured to guide the upward and downward movement of the valve spindle assembly 30 in the through hole 123, and the anti-rotation member 15 is configured to prevent the valve spindle assembly 30 from rotating with the rotor screw 21. Thus, the valve spindle assembly 30 can be supported by the support member 12 and can slide in a longitudinal direction of the electronic expansion valve, but the valve spindle assembly 30 cannot rotate around a longitudinal axis of the electronic expansion valve (or through hole).

Optionally, the guide member 14 may have a cylindrical structure with a hollow cavity, and the valve spindle 31 is slidable up and down along the hollow cavity of the guide member 14. An inner surface of the anti-rotation member 15 engaged with the valve stem 31 may have a square shape, a hexagonal shape, or other profile for preventing rotation of the valve stem 31, and a corresponding structural profile may be formed on an outer surface of the valve stem 31.

The valve body 11 and the support member 12 described above are independent components respectively and are hermetically joined together. Optionally, the valve body 11 and the support member 12 may be formed as an integral piece.

In an embodiment according to the present disclosure, the valve stem 31 may be fixedly engaged with the valve spindle 32, for example, the valve spindle 32 may be press-fitted into the valve stem 31. Specifically, as shown in FIGS. 3 to 8, a second end portion 312 of the valve stem 31 opposite to the first end portion 311 may be provided with a stepped recess 313 (for example, having a protruding stepped portion 3131). The valve spindle 32 may include a cylindrical first end portion 321 and a tapered second end portion 322. The cylindrical first end portion 321 is press-fitted into the stepped recess 313 of the valve stem 31, so that the tapered second end portion 322 abuts against a stepped portion 3131 of the stepped recess 313. Moreover, the tapered second end portion 322 protrudes out of the end surface of the second end portion 312 of the valve stem 31 to cooperate with the valve port 13.

A sealing member (referred to as a valve-port sealing member for ease of description) S3 may be provided between the stepped recess 313 of the valve stem 31 and a side surface of the tapered second end portion 322 of the valve spindle 32 to provide a hermetical cooperation between the valve spindle 32 and the valve port V when the spindle 32 abuts against the valve port V, thereby further preventing the fluid communication between the first cavity C1 and the second cavity C2.

A flange portion 131 is circumferentially provided on a mouth portion of the valve port 13 facing the first cavity C1. When the valve spindle 32 is in a position to close the valve port 13, the flange portion 131 may abut against the valve-port sealing member S3, and an outer diameter of the top of the flange portion 131 is smaller than the diameter of a recessed portion (that is, a portion of said stepped recess 313 assembled with the second end portion 322) of the valve stem 31 assembled with the second end portion 322, so that when the valve is closed, the fluid resistance acting on the valve spindle in the first cavity C1 can be balanced.

According to the present disclosure, the balance passage B described above may include a first passage B1 provided in the valve spindle 32, a second passage B2 provided in the valve stem 31, and a third passage B3 provided in the first end 211 of the rotor screw 21, and the first passage B1, the second passage B2, and the third passage B3 are in fluid communication with each other.

The first passage B1 may penetrate through the first end portion 321 and the second end portion 322 of the valve spindle 32, and the second passage B2 may penetrate through the first end portion 312 and the second end portion 322 of the valve stem 31. The third passage B3 may include an axial section B31 and a radial section B32 which are in fluid communication with each other. The axial section B31 extends axially from an end surface of the first end portion 211 of the rotor screw 21 along the first end portion 211 of the rotor screw 21, and the radial section B32 may extend from the axial section B31 through the wall of the rotor screw 21 into the second cavity C2. The radial section B32 may extend radially from a finish end of the axial section B31 through the wall of the rotor screw 21 (that is, an extending length of the radial section B32 is substantially equal to a radius of a corresponding section of the rotor screw 21). Or, the radial section B32 may extend radially through the wall portion of the rotor screw 21 and communicate with the axial section B31 (that is, an extending length of the radial section B32 is substantially equal to a diameter of a corresponding section of the rotor screw 21). Thereby, the second cavity C2 is in fluid communication with the second port II through the third passage B3, the second passage B2, and the first passage B1 described above. In addition, the second cavity C2 can further be in fluid communication with the second port II through the clearance between the rotor screw 21 and the threaded portion of the valve stem 31.

In the electronic expansion valve according to the present disclosure, the amount of fluid in the second cavity can be flexibly regulated by providing the balance passage B in the transmission mechanism to fluidly communicate the second cavity to the second port. The inventor has found through experiments that for an electronic expansion valve without the balance passage, the maximum valve opening capacity thereof is that, under a pressure difference of 4.83 MPa, the opening degree of the valve port can reach a bore with a diameter of 3.5 mm. The maximum valve opening capacity of the electronic expansion valve according to the present disclosure is that, under the pressure difference of 4.83 MPa, the opening degree of the valve port can reach a bore with a diameter of 5.7 mm.

Therefore, in the electronic expansion valve according to the present disclosure, the driving force required by the driving mechanism to drive the valve spindle assembly is greatly reduced, thereby simplifying the structure of the electronic expansion valve and reducing the cost.

While the various embodiments of the present disclosure have been described in detail herein, it is conceivable that the present disclosure is not limited to the specific embodiments described and illustrated herein in detail, and other variations and modifications can be made by the person skilled in the art without departing from the spirit and scope of the present disclosure. All the variations and modifications fall within the scope of the present disclosure. Moreover, all of the components described herein may be replaced by other technically equivalent components.

The invention claimed is:

1. An electronic expansion valve, comprising:
a valve body, wherein the valve body is provided with a first port for fluid to flow in or out and a second port for fluid to flow out or in; the valve body defines a first cavity therein which is in fluid communication with the first port; and the valve body is further provided with a valve port located between the second port and the first cavity, and the first cavity is selectively in fluid communication with the second port through the valve port;
a driving mechanism which is fixed to the valve body and comprises a stator and a rotor, wherein the rotor is integrally connected with a rotor screw;
a valve spindle assembly which is at least partially provided in the valve body, wherein the valve spindle assembly is capable of cooperatively cooperating with the rotor screw for reciprocating motion such that the valve spindle assembly is movable in an axial direction relative to the rotor screw, thereby regulating an opening degree of the valve port; and
a second cavity which is defined between the rotor and the valve spindle assembly, wherein the second cavity is adjacent to the rotor, and wherein the second cavity is isolated and sealed off from the first cavity,
wherein a balance passage is provided in the rotor screw and the valve spindle assembly so that the second cavity is in fluid communication with the second port through the balance passage.

2. The electronic expansion valve according to claim 1, wherein the valve spindle assembly comprises a valve stem and a valve spindle which cooperate with each other, the balance passage comprises a first passage provided in the valve spindle, a second passage provided in the valve stem and a third passage provided in the rotor screw, and the first passage, the second passage, and the third passage are in fluid communication with each other.

3. The electronic expansion valve according to claim 2, wherein the valve stem is operatively engaged with the rotor screw via a threaded portion provided in the valve stem, and the second cavity is further be capable of being in fluid communication with the second port through a clearance between the rotor screw and the threaded portion of the valve stem.

4. The electronic expansion valve according to claim 3, wherein the third passage comprises an axial section and a radial section which are formed in the rotor screw and are in fluid communication with each other.

5. The electronic expansion valve according to claim 2, wherein the second cavity is isolated and sealed off from the first cavity by a cavity sealing member provided outside the valve stem.

6. The electronic expansion valve according to claim 5, wherein the electronic expansion valve further comprises a support member, the driving mechanism is supported on the valve body by the support member, the valve spindle assembly is supported by the support member so that the valve spindle assembly is slidable in a longitudinal direction of the electronic expansion valve but is not rotatable.

7. The electronic expansion valve according to claim 6, wherein the support member has a through hole in the center, the valve spindle assembly is slidable in the through hole and the cavity sealing member is provided in the through hole and surrounds the valve stem.

8. The electronic expansion valve according to claim 6, wherein the valve body and the support member are joined together via a threaded connection and a valve-body sealing member is provided between the valve body and the support member.

9. The electronic expansion valve according to claim 2, wherein the valve stem is fixedly engaged with the valve spindle.

10. The electronic expansion valve according to claim 9, wherein the valve body has a first end portion and a second end portion which are opposite to each other, wherein the second port is provided in the first end portion of the valve body and the first port is provided on a side wall of the valve body;

the electronic expansion valve further comprises a support member and the support member has a first portion and a second portion, wherein the first portion is hermetically and fixedly connected to the second end portion of the valve body, and the stator of the driving mechanism is supported on the second portion; and the first cavity is defined in the valve body between the first portion of the support member and the second port.

11. The electronic expansion valve according to claim 10, wherein a radial extension portion extending radially inward from an inner wall of the valve body is provided at the first end portion of the valve body, and the valve port penetrates the radial extension portion and is provided at the center of the radial extension portion.

12. The electronic expansion valve according to claim 11, wherein the valve spindle comprises a tapered end portion which is configured to cooperate with the valve port to regulate the opening degree of the electronic expansion valve, and a valve-port sealing member is provided outside the tapered end portion.

13. The electronic expansion valve according to claim 12, wherein a flange portion is circumferentially provided on a mouth portion of the valve port facing the first cavity, and when the valve spindle is in a position to close the valve port, the flange portion abuts against the valve-port sealing member.

* * * * *